Figure 1:
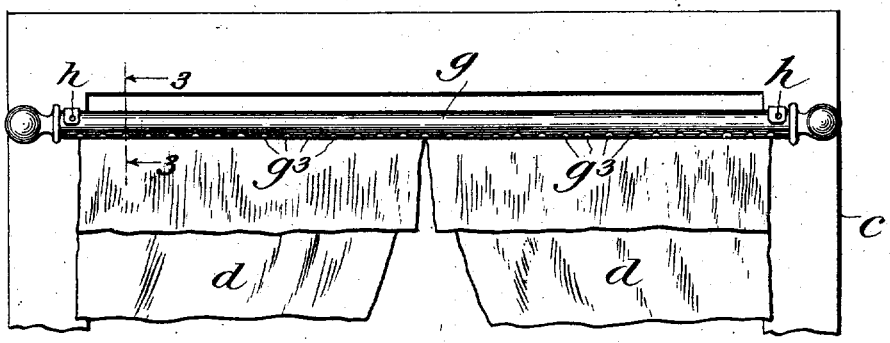

No. 12,731. REISSUED DEC. 3, 1907.

A. A. PAGE.

WINDOW CURTAIN SUSPENDING DEVICE.

APPLICATION FILED NOV. 1, 1907.

Witnesses:
C. E. Mulreany
H. C. Brody

Inventor,
Arthur A. Page.
By Edgar Tate & Co. Att'ys.

THE NORRIS PETERS CO., WASHINGTON, D. C.

UNITED STATES PATENT OFFICE.

ARTHUR ASHWELL PAGE, OF BROOKLYN, NEW YORK.

WINDOW-CURTAIN-SUSPENDING DEVICE.

No. 12,731. Specification of Reissued Letters Patent. Reissued Dec. 3, 1907.

Original No. 865,520, dated September 10, 1907, Serial No. 355,406. Application for reissue filed November 1, 1907. Serial No. 400,377.

*To all whom it may concern:*

Be it known that I, ARTHUR ASHWELL PAGE, a subject of the King of Great Britain, and residing at Brooklyn, in the county of Kings and State of New York, have invented certain new and useful Improvements in Window-Curtain-Suspending Devices, of which the following is a specification, such as will enable those skilled in the art to which it appertains to make and use the same.

This invention relates to devices for suspending window curtains, portières and similar articles, and the object thereof is to provide an improved device or devices of this class by means of which a window curtain, portière or similar article may be easily and conveniently connected with and suspended from a pole without the use of pins or similar fastening devices.

Figure 2:
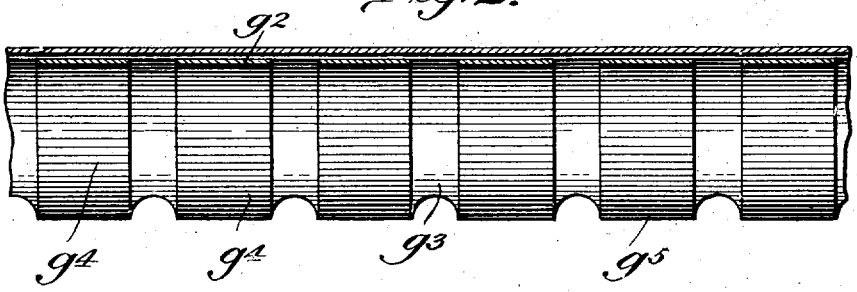
Figure 3:
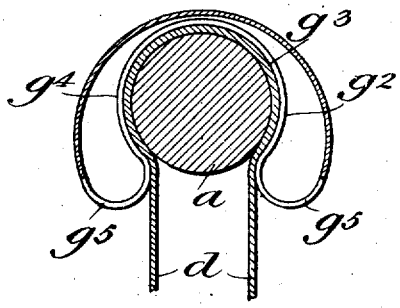
Figure 4:
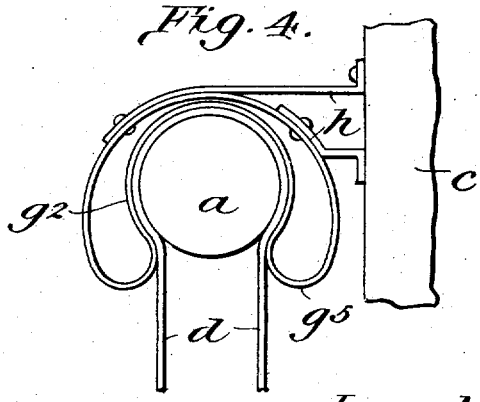

The invention is fully disclosed in the following specification, of which the accompanying drawing forms a part, in which the separate parts of my improvement are designated by suitable reference characters in each of the views, and in which;

Figure 1 is an inside view of a top portion of a window provided with curtains suspended by means of my improved curtain suspending device; Fig. 2 a longitudinal vertical section of my improved curtain suspending device; Fig. 3 a transverse section of my improved curtain suspending device on the line 3—3 of Fig. 1 and showing also a portion of a curtain. Fig. 4 an end view of the device as shown in Fig. 1.

In the drawing forming part of this specification, I have shown at *a* an ordinary curtain pole and at *c* a part of a window frame, and in the practice of my invention, I provide a continuous spring metal clamp *g*, which is substantially tubular in form and open at the bottom side thereof longitudinally thereof and which may be connected with the window frame by means of brackets or similar devices as shown in Figs. 1 and 4. The clamp *g* is composed of a spring metal tube, the bottom portion of which is folded inwardly as clearly shown in Figs. 3 and 4, throughout the length of said tube, and this makes the side walls of said clamp double and the inner part $g^2$ is provided at intervals with transverse slots $g^3$ which divide the same into separate segmental spring members $g^4$, and the slots $g^3$ extend downwardly through the loop portions $g^5$ which connect the inner and outer portions of the clamp *g* and said slots provide for the folding of the curtains or portières if the same be necessary, and this construction of the inner part of the clamp or holder renders the same more elastic and enables it to more securely hold the pole and curtain.

In practice the end of the curtain or portière is passed over the pole as shown in Figs. 3 and 4, and the said pole with the curtain or portière folded thereover is forced into the clamp or up through the longitudinal slot or opening in the bottom thereof into the tubular portion thereof as clearly shown in said figures where it is securely held. It will be understood that the pole and curtain or portière may be removed from the clamp at any time by pulling downwardly on the end of the pole or on the folded curtain or portière with sufficient force to disconnect the pole from the clamp or holder, and by means of my improvement I provide a convenient and ornamental support for curtains, portières and similar articles which is simple in construction and operation and comparatively inexpensive, and by means of which the use of pins or similar fastening devices is obviated.

Having fully described my invention, what I claim as new and desire to secure by Letters Patent, is:—

1. In a suspending device, a spring clamp segmental in cross section and into which a pole with a folded curtain, portière or the like may be inserted, said spring clamp being composed of inner and outer members and the inner member being provided with transverse slots forming openings therein.

2. The herein described means for suspending a curtain, portière or the like consisting of a pole over which one end of the curtain, portière or the like is folded, and a spring clamp segmental in cross section and into which the pole with the folded curtain, portière or the like is inserted, said spring clamp being composed of inner and outer members, and the inner member being provided with transverse slots forming openings therein.

In testimony that I claim the foregoing as my invention I have signed my name in presence of the subscribing witnesses this 1st day of February 1907.

ARTHUR ASHWELL PAGE.

Witnesses:

C. E. MULREANY,

A. WORDEN GIBBS.